(12) United States Patent
Roberts et al.

(10) Patent No.: US 7,229,137 B2
(45) Date of Patent: Jun. 12, 2007

(54) METHOD AND APPARATUS FOR LOCATING AN AXLE TORQUE PLATE

(75) Inventors: Paul Roberts, Newport (GB); Royston Leonard Morris, Newport (GB); Michael Gaywood, Newport (GB); Nagaraja Gargeshwari, Bangalore (IN)

(73) Assignee: Meritor Heavy Vehicle Braking Systems (UK) Ltd. (GB)

( * ) Notice: Subject to any disclaimer, the term of this patent is extended or adjusted under 35 U.S.C. 154(b) by 157 days.

(21) Appl. No.: 10/770,871

(22) Filed: Feb. 3, 2004

(65) Prior Publication Data

US 2005/0168056 A1 Aug. 4, 2005

(51) Int. Cl.
*F16D 65/02* (2006.01)

(52) U.S. Cl. ............... 301/124.1; 301/6.1; 188/73.39; 188/73.46

(58) Field of Classification Search ............ 301/6.1, 301/6.8, 124.1, 125, 127, 105.1; 188/71.1, 188/73.1, 73.31, 218 XL, 73.46
See application file for complete search history.

(56) References Cited

U.S. PATENT DOCUMENTS

| | | | | |
|---|---|---|---|---|
| 1,876,541 A | * | 9/1932 | Apple | 188/156 |
| 1,968,590 A | * | 7/1934 | Apple | 188/156 |
| 2,754,936 A | * | 7/1956 | Butler | 188/72.5 |
| 2,930,451 A | * | 3/1960 | Burnett | 188/70 B |
| 3,907,081 A | * | 9/1975 | Smith et al. | 188/73.46 |
| 3,970,174 A | * | 7/1976 | Kirkhart | 188/251 A |
| 4,080,003 A | * | 3/1978 | Boughton | 301/125 |
| 4,135,766 A | * | 1/1979 | Trautloff | 301/114 |
| 4,212,376 A | * | 7/1980 | Enright et al. | 188/218 XL |
| 4,311,216 A | * | 1/1982 | Garrett et al. | 188/18 A |
| 4,354,711 A | * | 10/1982 | Main | 301/35.63 |
| 4,363,522 A | * | 12/1982 | Palovcik | 301/131 |
| 4,768,839 A | * | 9/1988 | Spindler | 301/124.1 |
| 5,553,927 A | * | 9/1996 | Mastrangelo | 301/124.1 |
| 6,572,199 B1 | * | 6/2003 | Creek et al. | 301/124.1 |
| 6,701,763 B2 | * | 3/2004 | Varela | 72/61 |
| 6,702,068 B1 | * | 3/2004 | Riebe | 188/71.5 |
| 6,926,122 B2 | * | 8/2005 | Wittlinger et al. | 188/18 A |

* cited by examiner

*Primary Examiner*—Russell D. Stormer
(74) *Attorney, Agent, or Firm*—Carlson, Gaskey & Olds

(57) ABSTRACT

A trailer axle assembly includes a non-rotating axle tube that extends laterally between a pair of wheel ends. Each wheel end supports a disc brake assembly that selectively generates a braking force to slow or stop rotation of the wheel ends. The disc brake assemblies include a torque plate that is mounted to the axle tube. The axle tube includes a radial location feature that holds the torque plate fixed relative to the axle tube so that rotational brake torque is transmitted directly through a solid interface. The axle tube also includes an axial location feature that positions the torque plate at a predetermined location along the axle beam and prevents relative axial movement between the axle beam and the torque plate.

20 Claims, 2 Drawing Sheets

METHOD AND APPARATUS FOR LOCATING AN AXLE TORQUE PLATE

BACKGROUND OF THE INVENTION

The subject invention generally relates to a method and apparatus for mounting a torque plate for a disc brake assembly to a trailer axle beam. More specifically, the trailer axle beam includes radial and axial locating features that properly position and securely mount the torque plate to the axle beam.

Trailer axles include a tubular axle beam that extends between a pair of wheel end assemblies. The wheel ends assemblies each include a braking mechanism for selectively braking the rotating wheel ends. Various different types of braking mechanisms can be used on the trailer axles including cam, wedge, or disc brakes, for example.

Currently, disc brakes for trailer axles are bolted to a torque plate, which is welded to the axle beam. During the welding process, there is potential for distortion of the torque plate, which can affect the orientation of the brake mounting face of the toque plate. A final machining step is typically required after welding to ensure that the brake mounting face is flat and square to an axis of rotation defined by the axle beam. This extra machining step increases the overall cost and assembly time.

Further, the weld interface between the axle beam and the torque plate must be strong enough to resist the high rotational brake torque values generated during braking. Any deficiencies in the weld could result in high stress cracking or fatigue wear, which could reduce the wear life of the braking component or result in a premature failure.

There is a need for an improved interface between the torque plate and a trailer axle beam that eliminates the torque resistant weld and subsequent machining steps. The interface should be easily incorporated into existing beam designs and easy to assemble onto the beam, as well as overcoming the other above-mentioned deficiencies in the prior art.

SUMMARY OF THE INVENTION

A torque plate is mounted to a non-rotating axle component by radially locating the torque plate on the axle component with a first location member to prevent relative rotation between the torque plate and the axle component and axially locating the torque plate on the axle component with a second location member to prevent relative axial movement between the torque plate and the axle component.

In one disclosed embodiment, the non-rotating axle component comprises a non-rotating axle beam for a non-drive trailer axle assembly. The axle beam preferably has a generally tubular or circular cross-sectional shape. Wheel end assemblies are supported on each end of the axle beam. Each wheel end assembly includes a disc brake assembly having a rotor mounted for rotation relative to the axle beam, a pair of brake shoes, and a brake actuator and caliper for selectively moving the brake shoes into engagement with the rotating brake rotor. The disc brake assembly includes a non-rotating torque plate that is mounted to the axle beam via the first and second location members.

In one disclosed embodiment the first location member is a radial location member that comprises a plurality of male members formed on one of the axle beam or torque plate and a plurality of female members formed on the other of the axle beam or torque plate. The male members are inserted at least partially into the female members to prevent rotation between the torque plate and the axle beam and to allow rotational brake torque to be directly transmitted through a solid interface. The male members could be formed as splines, teeth, pins, protrusions, or other similar members. The female members could be grooves, slots, aperture, holes, or other similar members. Further, the male and female members could be integrally formed on one of the torque plate or axle beam or could be mounted as separate components to the torque plate or axle beam.

In one disclosed embodiment, the second location member is an axial location member that locates the torque plate at a predetermined location along the lateral length of the axle beam, and which prevents relative axial movement between the torque plate and the axle beam. The axial location member is preferably a ring that is mounted to the axle beam. The ring has a greater diameter than the axle beam, thus forming a circular flange. The torque plate abuts against the flange to prevent relative axial movement. Or, the axial location member could comprises a simple weld that holds the torque plate in the proper position on the axle beam, but is not subjected to high rotational brake torque forces.

The subject invention eliminates the need for a weld interface between the torque plate and axle beam and provides a mounting interface that can withstand high rotational brake torque forces. Further, the subject invention eliminates the need for subsequent machining of the torque plate prior to installation of the disc brake assembly. These and other features of the present invention can be best understood from the following specification and drawings, the following of which is a brief description.

DETAILED DESCRIPTION OF THE PREFERRED EMBODIMENT

Figure 1:
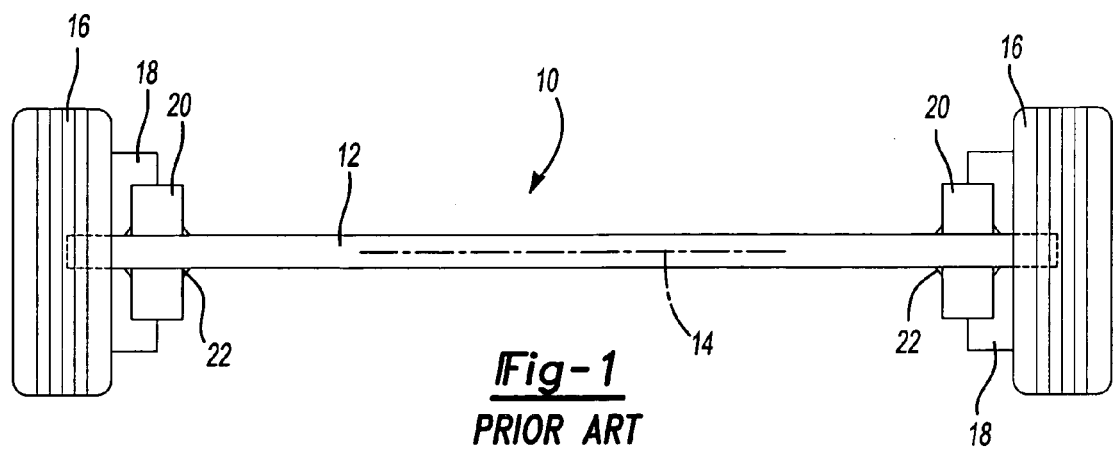
FIG. 1 is a schematic view of a trailer axle and disc brake assembly showing a traditional torque plate attachment interface.
Figure 2:
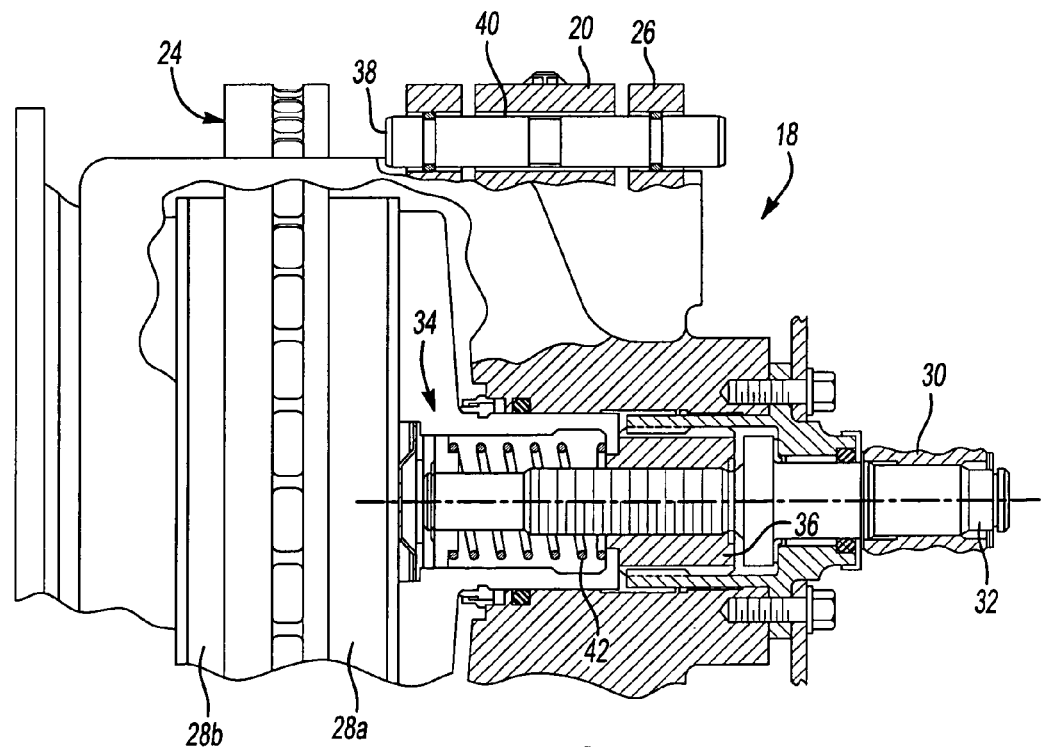
FIG. 2 is a partial cross-sectional view of one example of a disc brake assembly.

A non-drive trailer axle assembly is shown generally at 10 in FIG. 1. The trailer axle assembly 10 includes a non-rotating axle tube or beam 12 having a generally circular cross section. While a circular-cross section is traditionally used, it should be understood that the axle beam 12 could have other cross-sectional shapes that would benefit from the subject invention. The axle beam 12 defines a lateral axis of rotation 14 about which a pair of wheel end assemblies 16 rotate. The wheel end assemblies 16 are mounted on opposing ends of the axle beam 12.

Each wheel end assembly 16 includes a disc brake assembly 18 having a torque plate 20. Traditionally in the prior art, the torque plate 20 is welded to the axle beam 12 along a weld interface 22. The disc brake assembly 18 is then bolted to the torque plate 20. The torque plate 20 serves as a reaction component that resists the high rotational brake torque forces that are generated during braking.

The disc brake assembly 18 further includes a rotor disc 24, caliper 26, and inboard and outboard brake shoes 28a, 28b positioned on opposing sides of the rotor disc 24. The brake assembly 18 is preferably air actuated and includes an air chamber (not shown) that is coupled to a slack adjuster 30, which cooperates with a camshaft 32 to actuate the brake assembly 18. The camshaft 32 cooperates with a brake piston 34 and the caliper 26 to move the brake shoes 28a, 28b into engagement with the rotor disc 24.

When the braking assemblies 18 are actuated, the air chamber actuates the slack adjuster 30, which is mounted to the camshaft 32. The movement of the slack adjuster 30 rotates the camshaft 32, which causes a camshaft nut 36 to slide out along the camshaft 32. The camshaft nut 36 exerts a force against the brake piston 34, which pushes the inboard brake shoe 28a against the rotor disc 24. The force of the inboard brake shoe 28a exerted against the rotor disc 24 pulls the caliper 26 in along a pair of slide pins 38 (only one is shown). The slide pins 38 extend through the torque plate 20 and the brake caliper 26. The slide pins 38 are each supported on a torque plate bushing 40 (only one is shown). The torque plate 20 provides a reaction surface for the caliper 26 that resists the high rotational brake torque forces that are generated during brake applications.

Movement of the caliper 26 pulls the outboard brake shoe 28b into contact with the rotor disc 24, thus generating a clamping force on both sides of the rotor disc 24. When the brakes are released, a piston return spring 42 retracts the brake piston 34 and releases the clamping force.

As discussed above, the torque plate 20 is traditionally welded directly to the axle beam 12 along a weld interface 22. This weld interface 22 has several disadvantages. During the welding process, there is potential for distortion of the torque plate 20, which can affect the orientation of the brake mounting face of the toque plate 20 relative to the axis of rotation 14. A final machining step is required after welding to ensure that the brake mounting face is generally flat and square to the axis of rotation 14. This extra machining step increases the overall cost and assembly time for installation of the brake assembly 18 on the axle 10.

Further, the weld interface 22 between the axle beam 12 and the torque plate 20 must be strong enough to resist the high rotational brake torque values generated during braking. Any deficiencies in the weld could result in premature wear or failure, which is undesirable.

Figure 3:
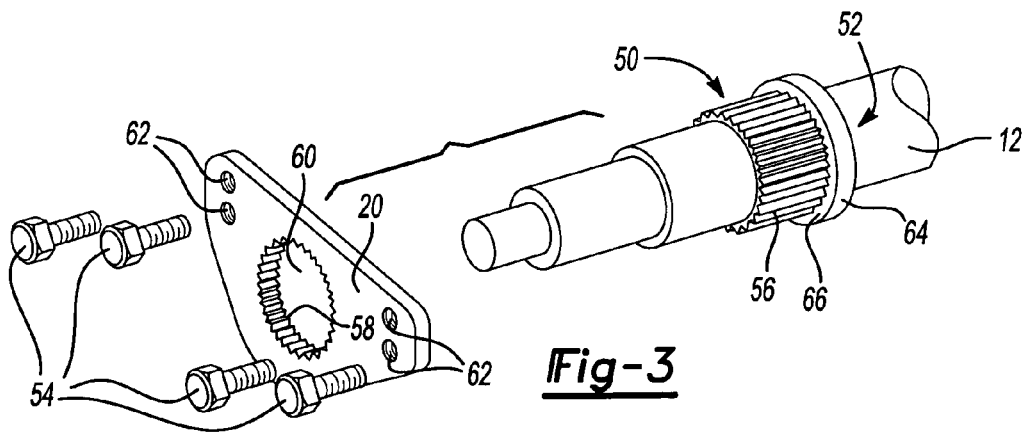
FIG. 3 is an exploded view, partially broken away, of one embodiment of an attachment interface between a trailer axle beam and a torque plate for a disc brake assembly incorporating the subject invention.

The subject invention provides an improved mounting interface between the torque plate 20 and the axle beam 12. As shown in FIG. 3, the axle beam 12 includes a radial location feature or member, shown generally at 50, such that the rotational brake torque can be transmitted directly through a solid interface, eliminating the need for a welded interface. The radial location feature 50 prevents relative rotation between the torque plate 20 and the axle beam 12.

In one disclosed embodiment, the radial location member 50 includes a plurality of male members located or supported on one of the torque plate 20 or axle beam 12 and a plurality of female members located or supported on the other of the torque plate 20 or axle beam 12. The male members are at least partially received within the female members to prevent relative rotation between the axle beam 12 and the torque plate 20. The male and female members can be formed in various different configurations. This will be disclosed in greater detail below.

The axle beam 12 also includes an axial location feature or member, shown generally at 52, which positions the torque plate 20 at a proper predetermined position along a lateral length of axle beam 12. The axial location feature 52 prevents relative axial movement between the torque plate 20 and the axle beam 12.

FIGS. 3 through 6 show various embodiments of the radial 50 and axial 52 location members. It should be understood that any of the radial location features 50 could be used in combination with any of the axial location features 52 and vice versa. Further, FIGS. 3 through 6 show only one end of the axle beam 12. It should be understood that the opposite end of the axle beam 12 includes a similar torque plate mounting interface. Finally, once the torque plate 20 is mounted to the axle beam 12, the disc brake assembly 18 is attached to the torque plate 20 with fasteners 54.

In the example shown in FIG. 3, the radial location member 50 comprises a plurality of splines or teeth 56 formed about an outer circumference of the axle beam 12. The torque plate 20 includes a mating plurality of spline grooves or slots 58 formed on an inner circumference. The inner circumference defines an aperture 60 that receives the axle beam 12. The splines or teeth 56, which can be integrally formed or machined into the axle beam 12, matingly or meshingly engage the spline grooves or slots 58 formed in the torque plate 20. This prevents relative rotation between the torque plate 20 and the axle beam 12. The brake assembly 18 is then bolted to the torque plate 20 via a bolted joint interface 62.

The axial location feature 52 of FIG. 3 comprises a ring 64 that is separately mounted or integrally formed on the axle beam 12. The separately mounted ring 64 can be welded or pressed onto the axle beam 12. The ring 64 has a greater diameter than the axle beam 12 to form a circumferential flange 66. The torque plate 20 engages or abuts directly against the flange 66. Thus, the flange 66 provides an end stop that prevents axial movement between the axle beam 12 and the torque plate 20 once the brake assembly 18 is bolted into place.

Figure 4:
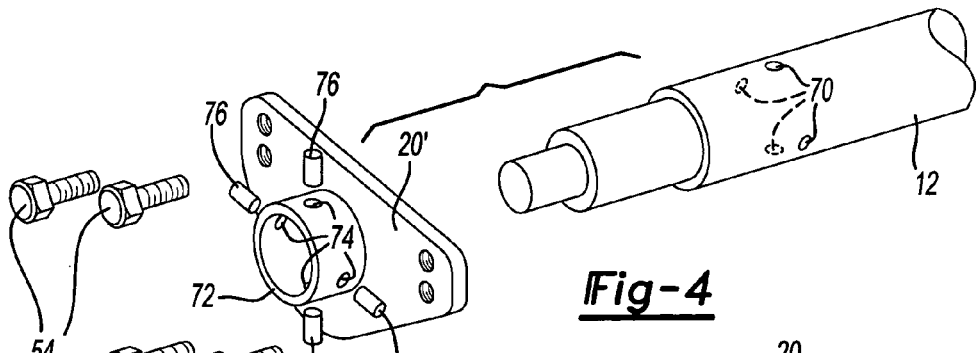
FIG. 4 is an exploded view, partially broken away, of another embodiment of an attachment interface between a trailer axle beam and a torque plate for a disc brake assembly incorporating the subject invention.

The radial location feature 50 of FIG. 4 comprises a first plurality of openings or apertures 70 that are formed in one end of the axle beam 12. Torque plate 20' includes a cuff portion 72 that includes a second plurality of holes or apertures 74. The first and second plurality of holes 70, 74 are aligned with one another and a plurality of radial pins 76 are inserted into the holes 70, 74. This prevents relative rotation between the axle beam 12 and the torque plate 20'. The pins 76 could be integrally formed in or pre-assembled onto one of the cuff portion 72 or axle beam 12. Alternatively, threaded fasteners or other similar fastening elements could be used.

Figure 5:
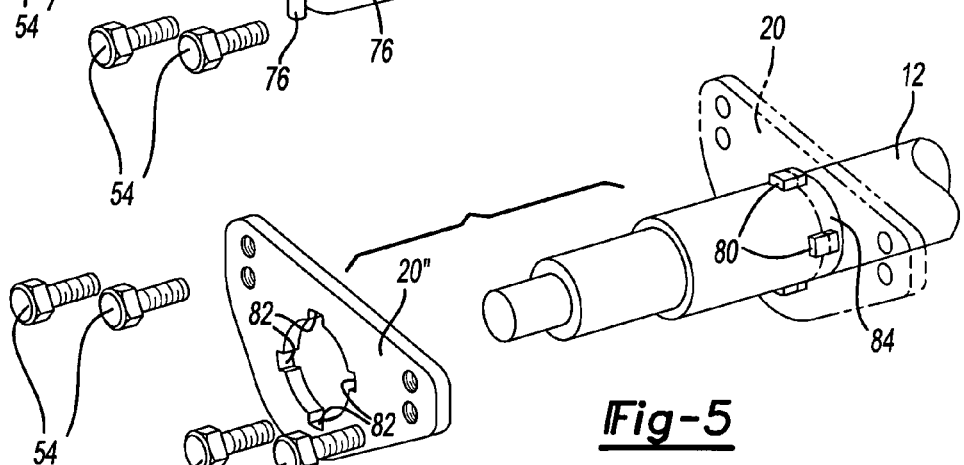
FIG. 5 is an exploded view, partially broken away, of another embodiment of an attachment interface between a trailer axle beam and a torque plate for a disc brake assembly incorporating the subject invention.

The radial location feature 50 of FIG. 5 comprises a plurality of pressed/semi-sheared protrusions 80 formed on an outer circumference of the axle tube 12. A plurality of slots or grooves 82 are formed on an inner circumference of torque plate 20''. The protrusions 80 are received within the slots 82 to prevent relative rotation between the axle beam 12 and the torque plate 20''.

The axial location feature 52 of FIG. 5 comprises a simple weld interface 84. This weld interface solely functions to locate and hold an axial position of the torque plate 20 on the axle beam 12. The weld interface 84 is a non-torque bearing weld and does not have any critical strength requirements.

Figure 6:
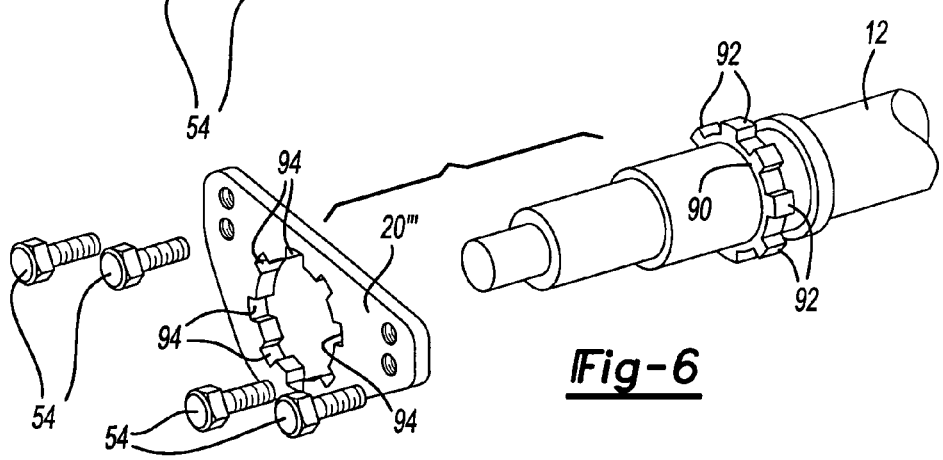
FIG. 6 is an exploded view, partially broken away, of another embodiment of an attachment interface between a trailer axle beam and a torque plate for a disc brake assembly incorporating the subject invention.

The radial location feature 50 of FIG. 6 comprises an extruded ring 90 that is welded or press fit onto the outer diameter of the axle beam 12. The ring 90 includes a plurality of teeth 92 formed about the outer circumference of the ring 90. Torque plate 20''' includes a plurality of mating teeth 94 formed about an inner circumference. The teeth 92, 94 are intermeshed to prevent relative rotation between the axle beam 12 and the torque plate 20'''.

By using radial 50 and axial 52 location members, the subject invention eliminates the need for a weld interface between the torque plate 20 and axle beam 12 and provides a mounting interface that can withstand high rotational brake torque forces. Also, because the weld interface is eliminated, the axle beam 12 and/or torque plate 20 can be formed from cast ductile iron, which also reduces cost. Further, the subject invention eliminates the need for subsequent machining of the torque plate 20 prior to installation of the disc brake assembly 18. Finally, the subject invention is easily incorporated into various braking configurations including integrated brakes, and provides flexibility for clocking. Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A wheel end assembly for an axle comprising:
a non-rotating component defining a lateral axis;
at least one torque plate mounted to said non-rotating component;
a brake assembly mounted to said torque plate; and
a radial location member supported by said non-rotating component, said radial location member comprising one of a plurality of teeth formed on a ring that surrounds said non-rotating component and a plurality of radial pins extending radially outwardly from said lateral axis, and wherein said torque plate includes corresponding structure that cooperates with one of said plurality of teeth and said plurality of pins of said radial location member to transfer rotational brake torque between said brake assembly and said non-rotating component through a solid interface.

2. The assembly of claim 1 including an axial location member supported by said non-rotating component wherein said torque plate cooperates with said axial location member to position said torque plate at a predetermined location along said non-rotating component.

3. The assembly of claim 2 wherein said non-rotating component comprises a trailer axle beam for a non-drive trailer axle.

4. The assembly of claim 3 wherein said brake assembly comprises a disc brake assembly.

5. The assembly of claim 2 wherein said axial location member comprises an end stop supported on said non-rotating component with said torque plate engaging said end stop to prevent relative axial movement between said torque plate and said non-rotating component.

6. A wheel end assembly for an axle comprising:
a non-rotating component defining a lateral axis;
at least one torque plate mounted to said non-rotating component;
a brake assembly mounted to said torque plate;
a radial location member supported by said non-rotating component, said radial location member comprising one of a plurality of teeth and a plurality of radial protrusions extending radially outwardly from said lateral axis, and wherein said torque plate cooperates with said radial location member to transfer rotational brake torque between said brake assembly and said non-rotating component through a solid interface; and
an axial location member supported by said non-rotating component wherein said torque plate cooperates with said axial location member to position said torque plate at a predetermined location along said non-rotating component, said axial location member comprising an end stop supported on said non-rotating component with said torque plate engaging said end stop to prevent relative axial movement between said torque plate and said non-rotating component and wherein said end stop comprises a ring fixed to said non-rotating component, said ring having a greater diameter than said non-rotating component to form a generally circular flange wherein said torque plate directly engages said circular flange.

7. A wheel end assembly for an axle comprising:
a non-rotating component defining a lateral axis;
at least one torque plate mounted to said non-rotating component;
a brake assembly mounted to said torque plate;
a radial location member supported by said non-rotating component, said radial location member comprising one of a plurality of teeth formed on a ring that surrounds said non-rotating component and a plurality of radial protrusions extending radially outwardly from said lateral axis, and wherein said torque plate cooperates with said radial location member to transfer rotational brake torque between said brake assembly and said non-rotating component through a solid interface; and
an axial location member supported by said non-rotating component wherein said torque plate cooperates with said axial location member to position said torque plate at a predetermined location along said non-rotating component, said axial location member comprising an end stop supported on said non-rotating component with said torque plate engaging said end stop to prevent relative axial movement between said torque plate and said non-rotating component wherein said end stop comprises a non-torque bearing weld formed between said torque plate and said non-rotating component.

8. A non-drive trailer axle assembly comprising:
an axle beam having a generally tubular cross-section and defining a lateral axis extending along a length of said axle beam;
a first torque plate mounted to a first end of said axle beam;
a second torque plate mounted to a second end of said axle beam opposite from said first end;
a first disc brake assembly mounted to said first torque plate;
a second disc brake assembly mounted to said second torque plate;
first and second radial location members supported by said first and second ends of said axle beam, said first and said second radial location members extending radially outwardly from said lateral axis, and wherein said first and second torque plates cooperate with said first and second radial location members respectively to transfer rotational brake torque between said first and second disc brake assemblies and said axle beam; and first and second axial location members supported by said first and second ends of said axle beam wherein said first and second torque plates cooperate with said first and second axial location members to position said first and second torque plates at predetermined locations along said axle beam and wherein at least one of said first and second radial location members and said first and second axial location members comprises a separate component that is attached to said axle beam.

9. The assembly of claim 8 wherein each of said first and second radial location members comprises a plurality of male members supported on one of said first and second torque plates and said axle beam and a plurality of female members supported on the other of said first and second torque plates and said axle beam and wherein said plurality of male members are at least partially received within said plurality of female members to prevent relative rotation between said first and second torque plates and said axle beam.

10. The assembly of claim 9 wherein each of said first and second axial location members comprises an end stop supported on said axle beam with said first and second torque plates engaging a respective one of said end stops to prevent relative axial movement between said first and second torque plates and said axle beam.

11. The assembly of claim 9 wherein said first and second radial location members comprise one of a plurality of teeth and a plurality of radial pins extending radially outwardly relative to an outer circumferential surface of said axle beam.

12. A method of mounting a torque plate to a trailer axle component comprising the steps of:
 (a) providing a non-rotating axle tube for a non-drive trailer axle, the non-rotating axle tube defining a lateral axis;
 (b) radially locating a torque plate on the non-rotating axle tube with a first location member to prevent relative rotation between the torque plate and the non-rotating axle tube wherein the first location member comprises a plurality of radial members extending radially outwardly from the lateral axis;
 (c) axially locating the torque plate on the non-rotating axle tube with a second location member to prevent relative axial movement between the torque plate and the non-rotating axle tube wherein at least one of the first and second location members comprises a component that is separately mounted to the non-rotating axle tube; and
 (d) mounting a disc brake assembly to the torque plate.

13. The method of claim 12 wherein the first location member is different than the second location member.

14. The method of claim 13 wherein step (b) further includes supporting a plurality of male members on one of the non-rotating axle tube and torque plate, supporting a plurality of female members on the other of the non-rotating axle tube and torque plate, and inserting the plurality of male members into the plurality of female members and step (c) further includes forming an end stop about an outer circumference of the non-rotating axle tube and abutting the torque plate against the end stop.

15. The method of claim 13 including performing step (b) without welding the torque plate to the non-rotating axle tube.

16. The method of claim 12 wherein step (d) further includes mounting the disc brake assembly to the torque plate without requiring any additional machining to the torque plate subsequent to steps (b) and (c).

17. The method of claim 12 wherein step (b) includes forming the plurality of radial members as one of a plurality of teeth and a plurality of radial pins extending radially outwardly relative to an outer circumferential surface of the non-rotating axle tube.

18. The method of claim 12 wherein the torque plate includes corresponding structure that receives the plurality of radial members and wherein step (b) includes mating he corresponding structure of the torque plate with the plurality of radial members.

19. A wheel end assembly for an axle comprising:
 a non-rotating component defining a lateral axis;
 at least one torque plate mounted to said non-rotating component;
 a brake assembly mounted to said torque plate; and
 a radial location member supported by said non-rotating component, said radial location member comprising one of a plurality of teeth and a plurality of radial protrusions extending radially outwardly from said lateral axis wherein said plurality of radial protrusions comprises a plurality of radial pins that extend radially outwardly relative to an outer circumferential surface of said non-rotating component, and wherein said torque plate cooperates with said radial location member to transfer rotational brake torque between said brake assembly and said non-rotating component through a solid interface.

20. The wheel end assembly of claim 19 wherein said torque plate includes corresponding structure that receives one of said plurality of teeth and said plurality of radial protrusions to form said solid interface.

* * * * *

UNITED STATES PATENT AND TRADEMARK OFFICE
CERTIFICATE OF CORRECTION

PATENT NO. : 7,229,137 B2 Page 1 of 1
APPLICATION NO. : 10/770871
DATED : June 12, 2007
INVENTOR(S) : Roberts et al.

It is certified that error appears in the above-identified patent and that said Letters Patent is hereby corrected as shown below:

Claim 18, Column 8, line 24: "he" should read as --the--

Signed and Sealed this

Fourteenth Day of August, 2007

JON W. DUDAS
*Director of the United States Patent and Trademark Office*